United States Patent [19]

Isoyama

[11] Patent Number: 5,366,199
[45] Date of Patent: Nov. 22, 1994

[54] GATE VALVE

[75] Inventor: Mitsunori Isoyama, Souraku, Japan

[73] Assignee: Kubota Corporation, Osaka, Japan

[21] Appl. No.: 243,323

[22] Filed: May 16, 1994

[30] Foreign Application Priority Data

Feb. 28, 1994 [JP] Japan .................. 6-029960

[51] Int. Cl.$^5$ ................................ F16K 3/00
[52] U.S. Cl. .................. 251/368; 251/328; 251/174
[58] Field of Search ............... 251/368, 328, 174, 366

[56] References Cited

U.S. PATENT DOCUMENTS

| | | | |
|---|---|---|---|
| 2,732,170 | 1/1956 | Shand | 251/328 |
| 3,013,769 | 12/1961 | Volpin | 252/328 |
| 3,348,567 | 10/1967 | Volpin | 251/328 |
| 4,364,544 | 12/1982 | Kim | 251/328 |

Primary Examiner—A. Michael Chambers
Attorney, Agent, or Firm—Jones, Tullar & Cooper

[57] ABSTRACT

The gate valve of the invention may be disposed in a flow path through which a hydrocarbon gas produced by thermal decomposition, or an exhaust gas passes. In the gate valve, ring-like valve body seats 5A, 5B, and ring-like retainers 14 and ring-like spacers 17 which are disposed on the both sides of the valve body seats are fitted into ring-like grooves 20 formed on faces of ring-like seal boxes 7 which oppose a sliding valve disc 2, in such a manner that the valve body seats, retainers and spacers are disabled from moving in a radial direction. Ring-like convex portions 21 formed on the ring-like seal boxes 7 are fitted into ring-like concave portions 22 on a valve body 1, in such a manner that the ring-like convex portions 21 are disabled from moving in a radial direction. Even when the sliding valve disc 2 moves, the ring-like valve body seats 5A, 5B, and the ring-like seal boxes 7 do not move. Accordingly, the lowering of the sealing properties due to the abrasion of ring-like seal members 9, the ingress of foreign substances into the spaces of housing second springs 11, and the fluid leakage into the space of the valve body 1 are prevented from occurring.

7 Claims, 4 Drawing Sheets

GATE VALVE

BACKGROUND OF THE INVENTION

1. Field of the Invention

The present invention relates to a gate valve, and particularly to a gate valve having a sealing structure which exhibits excellent sealing properties for a long period.

2. Description of the Prior Art

Conventionally, as a sealing structure of a gate valve, known is a technique disclosed in Japanese Utility Model Application Laying-Open No. 4-39469. The gate valve is shown in FIG. 4.

The gate valve comprises: a pair of ring-like seal boxes 7, 7 which are fastened to the inner face of a valve body 1 by plural first fastening members 12, 12 each consisting of a bolt and a nut, so as to oppose each other; a pair of backup rings 10, 10 respectively fitted into faces of the ring-like seal boxes 7, 7 which oppose a sliding valve disc 2; and a pair of ring-like seal members 9, 9 which extend over faces of the backup rings 10, 10 which oppose the sliding valve disc 2, and also the opposing faces of the ring-like seal boxes 7, 7. The gate valve further comprises: a pair of ring-like valve body seats 5A, 5B which respectively oppose the backup rings 10, 10 with the respective ring-like seal members 9, 9 between, and which are placed so as to contact with the sliding valve disc 2; ring-like spacers 17, 17 which are adjacent to the inner sides of the ring-like valve body seats 5A, 5B in a radial direction, which oppose the ring-like seal boxes 7, 7 with the ring-like seal members 9, 9 between, and which are fastened to the seal boxes 7, 7 by plural second fastening members 15, 15 each consisting of a bolt; and ring-like retainers 14, 14 which are adjacent to the outer sides of the ring-like valve body seats 5A, 5B in a radial direction, which oppose the ring-like seal boxes 7, 7 with the ring-like seal members 9, 9 between, and which are fastened to the ring-like seal boxes 7, 7 by plural third fastening members 13, 13 each consisting of a bolt. The gate valve further comprises: a pair of seat rings 6, 6 which prevent the valve body seats from slipping out, which oppose the ring-like seal boxes 7, 7 with the ring-like spacers 17, 17 between, and which are placed in the vicinity of the both faces of the sliding valve disc 2; plural first springs 8, 8 which are interposed between the ring-like spacers 17, 17 and the seat rings 6, 6 so as to urge the seat rings 6, 6 toward the both faces of the sliding valve disc 2; plural second springs 11, 11 which are interposed between the ring-like seal boxes 7, 7 and the backup rings 10, 10 so as to urge the ring-like valve body seats 5A, 5B toward the sliding valve disc 2 through the backup rings 10, 10 and the ring-like seal members 9, 9; and a pair of ring-like gaskets 19, 19 which are interposed the mating faces 16 between the pair of ring-like seal boxes 7, 7 and the valve body 1.

In the sealing structure of the thus configured gate valve, the seat rings 6, 6 are slightly pressed against the sliding valve disc 2 by the urging of the first springs 8, 8. As the sliding valve disc 2 moves, therefore, foreign substances adhering to the both faces of the valve disc are scraped off by the seat rings 6, 6, so that the closeness between the ring-like valve body seats 5A, 5B and the sliding valve disc 2 is kept at a satisfactory state to maintain the sealing properties. Since the seat rings 6, 6 are pressed against the sliding valve disc 2 by the urging of the first springs 8, 8, the operation of scraping off foreign substances is continued even when the seat rings 6, 6 are abraded with the passage of time, so that the closeness between the ring-like valve body seats 5A, 5B and the sliding valve disc 2 is prevented from being reduced, thereby continuing the function of maintaining the sealing properties.

On the other hand, while being prevented from bending by the backup rings 10, 10, the ring-like valve body seats 5A, 5B are pressingly contacted with the both faces of the sliding valve disc 2 by the urging of the second springs 11, 11, thereby maintaining the sealing properties. Since the ring-like valve body seats 5A, 5B are pressed against by the urging of the second springs 11, 11, even when the ring-like valve body seats 5A, 5B are abraded with the passage of time, the pressing force exerted on the sliding valve disc 2 can be prevented from lowering. Consequently, the function of maintaining the sealing properties is not impaired.

Even when the sliding valve disc 2 is slightly moved toward the downstream side (for example, the left side in FIG. 4) in which the pressure is lower by fluctuation of the pressure acting on the both faces of the sliding valve disc 2, the movement toward the downstream side is absorbed by the urging of the second springs 11, 11, i.e., the expansion of the second spring 11 of the right side and the contraction of the second spring 11 of the left side, so that the ring-like valve body seats 5A, 5B are pressingly contacted with the both faces of the sliding valve disc 2, thereby preventing the function of maintaining the sealing properties from being impaired.

The sealing function of the ring-like seal members 9, 9 prevents foreign substances from entering from a passage 18 into the spaces of housing the second springs 11, and a fluid from leaking into the space of the valve body 1. The sealing function of the ring-like gaskets 19, 19 prevents the leakage at the mating faces 16 between the ring-like seal boxes 7, 7 and the valve body 1 from occurring.

In the prior art gate valve, since the ring-like valve body seats 5A, 5B are strongly pressed against the sliding valve disc 2 by the elastic forces of the second springs 11, 11 and the fluid pressure acting on the sliding valve disc 2, a large frictional force is generated between the ring-like valve body seats 5A, 5B and the sliding valve disc 2. When the sliding valve disc 2 moves in either of the directions indicated by arrows, therefore, the ring-like valve body seats 5A, 5B are pulled in the movement direction to slightly moved in spite that the ring-like spacers 17, 17 are fastened to the ring-like seal boxes 7, 7 by the second fastening members 15, 15, and that the ring-like retainers 14, 14 are fastened to the ring-like seal boxes 7, 7 by the third fastening members 13, 13. This produces a phenomenon that the ring-like valve body seats 5A, 5B rub together the ring-like seal members 9, 9. As the frequency of the movement of the sliding valve disc 2 in the directions of the arrows becomes high, the ring-like seal members 9, 9 are abraded to impair the sealing properties, so that foreign substances enter from the passage 18 into the spaces of housing the second springs 11. This develops the possibilities that the pressing forces of the ring-like valve body seats 5A, 5B against the sliding valve disc 2 are lowered to impair the sealing properties of the gate valve, and that a fluid leaks into the space of the valve body 1 through the spaces of housing the second springs 11.

On the other hand, the slight movement of the ring-like valve body seats 5A, 5B which is caused by the movement of the sliding valve disc 2 in the directions of the arrows is transmitted to the ring-like retainers 14, 14 and the ring-like spacers 17, 17, and further transmitted to the ring-like seal boxes 7, 7 through the second fastening members 15, 15 and the third fastening members 13, 13. This may cause the ring-like seal boxes 7, 7 to slightly move, whereby producing the possibility that the ring-like gaskets 19, 19 interposed at the mating faces 16 between the ring-like seal boxes 7, 7 and the valve body 1 are abraded so that the sealing properties are impaired, thereby causing a leakage from the mating faces 16 to occur.

SUMMARY OF THE INVENTION

As described above, in such a prior art gate valve, when the ring-like seal boxes are caused to slightly move by the movement of the sliding valve disc, the ring-like seal members are abraded to impair the sealing properties, and foreign substances enter the spaces of housing the second springs to lower the spring function of the second springs, so that the pressing forces of the ring-like valve body seats exerted on the sliding valve disc are lowered, thereby producing problems in that the sealing properties of the gate valve are impaired, and that a fluid leaks into the space of the valve body through the spaces of housing the second springs. The prior art gate valve has a further problem in that, when the slight movement of the ring-like valve body seats is transmitted to the ring-like seal boxes so that the ring-like seal boxes are slightly moved, the ring-like gaskets interposed at the mating faces between the ring-like seal boxes and the valve body are abraded so that the sealing properties are impaired, thereby causing a leakage from the mating faces to occur.

The present invention has been conducted in order to solve these problems.

It is an object of the present invention to prevent a ring-like valve body seat contacting with a sliding valve disc, from moving even when the sliding valve disc moves, thereby preventing the ring-like valve body seat from rubbing together a ring-like seal member, and the ring-like valve body seat from being abraded.

It is another object of the present invention to prevent foreign substances from entering a space of housing a second spring, thereby reducing the possibilities that the pressing force of the ring-like valve body seat exerted on the sliding valve disc is lowered, and that a fluid leaks into the space of the valve body through the space of housing the second spring.

It is a further object of the present invention to prevent a ring-like seal box from moving even when the sliding valve disc moves, thereby preventing a ring-like gasket interposed at the mating face between the ring-like seal box and the valve body, from being abraded.

In order attain these objects, the gate valve of the present invention comprises:
 a valve body;
 a ring-like seal box placed on an inner face of the valve body;
 a first fastening member for fastening the ring-like seal box to the inner face of the valve body;
 a backup ring fittingly held on a face of the ring-like seal box which opposes a sliding valve disc;
 a ring-like seal member extending over the opposing face of the ring-like seal box, and a face of the backup ring which opposes the sliding valve disc;
 a ring-like valve body seat which opposes the backup ring with the ring-like seal member between, and which contacts with the sliding valve disc;
 a ring-like spacer which is adjacent to an inner side of the ring-like valve body seat in a radial direction, and which opposes the ring-like seal box with the ring-like seal member between;
 a second fastening member for fastening the ring-like spacer to the ring-like seal box;
 a ring-like retainer which is adjacent to an outer side of the ring-like valve body seat in a radial direction, and which opposes the ring-like seal box with the ring-like seal member between;
 a third fastening member for fastening the ring-like retainer to the ring-like seal member;
 a seat ring for preventing the valve body seat from slipping out, the seat ring being placed to oppose the ring-like seal box with the ring-like spacer between, the seat ring contacting with the sliding valve disc;
 a first spring which is interposed between the ring-like spacer and the seat ring to urge the seat ring toward the sliding valve disc;
 a second spring which are interposed between the ring-like seal box and the backup ring to urge the ring-like valve body seat toward the sliding valve disc through the backup ring and the ring-like seal member;
 a ring-like gasket which is interposed at a mating face between the ring-like seal box and the valve body;
 a fitting portion which is formed on the ring-like seal box, and which holds the ring-like retainer and the ring-like spacer while disabling the ring-like retainer and the ring-like spacer from moving in a radial direction; and
 a fitting portion which is formed on the valve body, and which holds the ring-like seal box while disabling the ring-like seal box from moving in a radial direction.

In the thus configured gate valve, the ring-like retainer and ring-like spacer which sandwich the ring-like valve body seat at the outer and inner sides of the seat are held by the fitting portion of the ring-like seal box in such a manner that the retainer and spacer are disabled from moving in a radial direction. Even when, during a movement of the sliding valve disc, the ring-like valve body seat is pulled in the movement direction by a large frictional force, therefore, the ring-like valve body seat does not move. In addition to the nonmovability of the ring-like valve body seat, the ring-like seal box does not move because it is held by the fitting portion of the valve body so as to be disabled from moving in a radial direction.

Even when the frequency of moving the sliding valve disc is increased, therefore, the ring-like seal member is not abraded and hence the lowering of the sealing properties due to the abrasion of the ring-like seal member can be avoided. In addition, the ingress of foreign substances into the space of housing the second spring, and the fluid leakage into the space of the valve body through the space of housing the second spring can surely be prevented from occurring. The prevention of the ingress of foreign substances into the space of housing the second spring can avoid the lowering of the spring function of the second spring, and that of the pressing force of the ring-like valve body seat exerted on the sliding valve disc, whereby the sealing properties of the gate valve are prevented from lowering. Moreover, the lowering of the sealing properties due to the abrasion of the ring-like gasket interposed at the mating face between the ring-like seal box and the valve body can be avoided so that the fluid leakage from the mating face can surely be prevented from occurring.

Other various features and effects of the present invention will be more fully apparent from the following description of embodiments thereof.

DETAILED DESCRIPTION OF THE PREFERRED EMBODIMENTS

Figure 1:
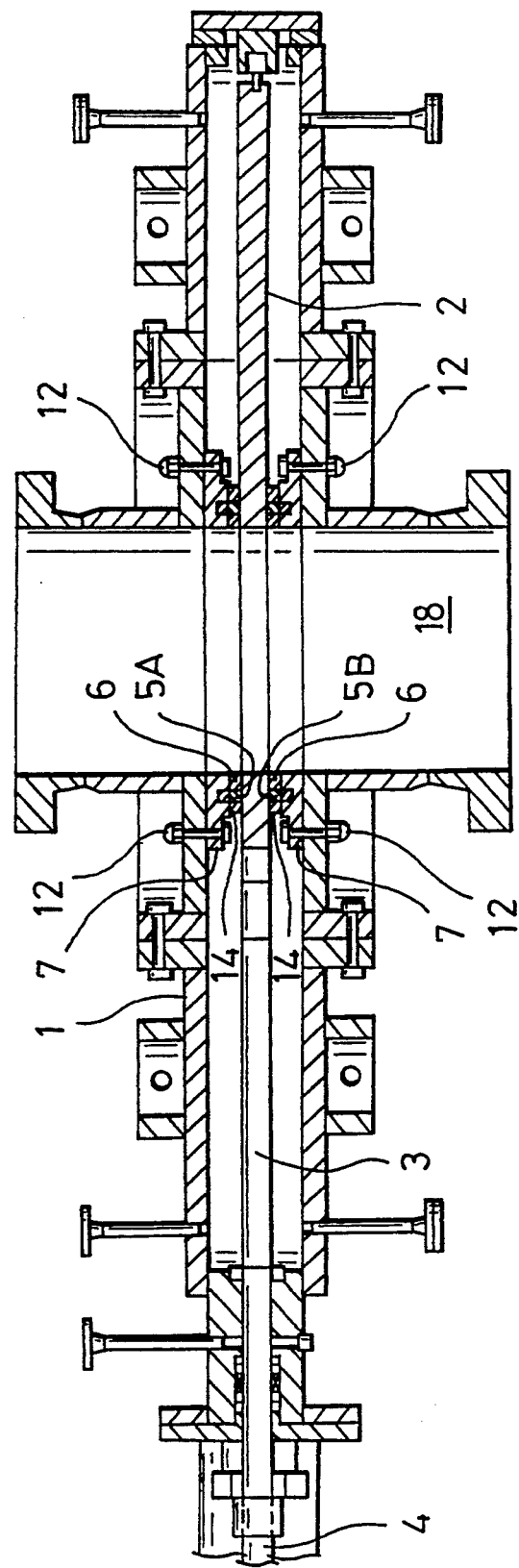
FIG. 1 is longitudinal section view showing a fully opened state of a gate valve to which the invention is applied.
Figure 2:
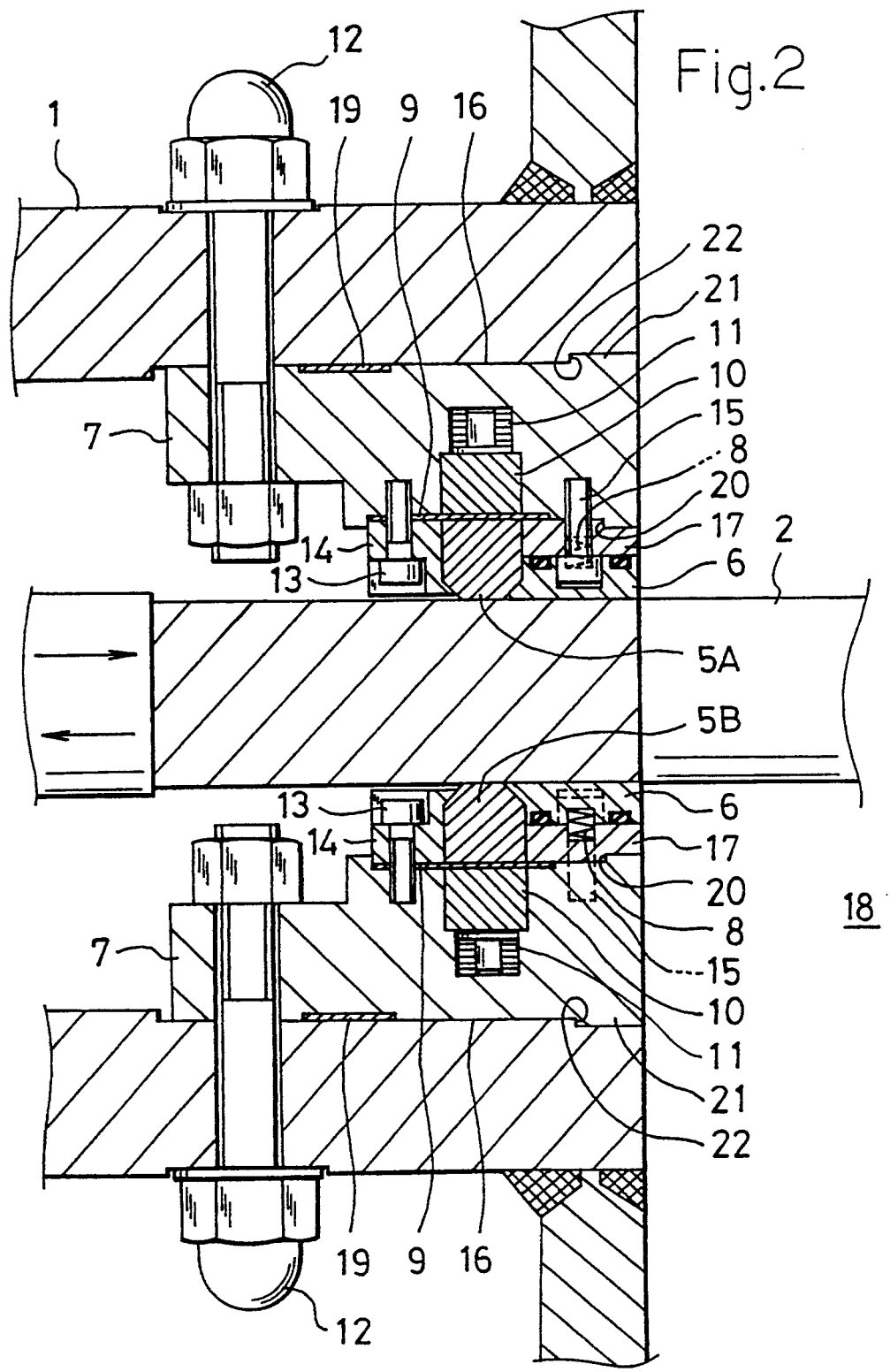
FIG. 2 is an enlarged half section view showing main portions of the gate valve to which the invention is applied.
Figure 4:
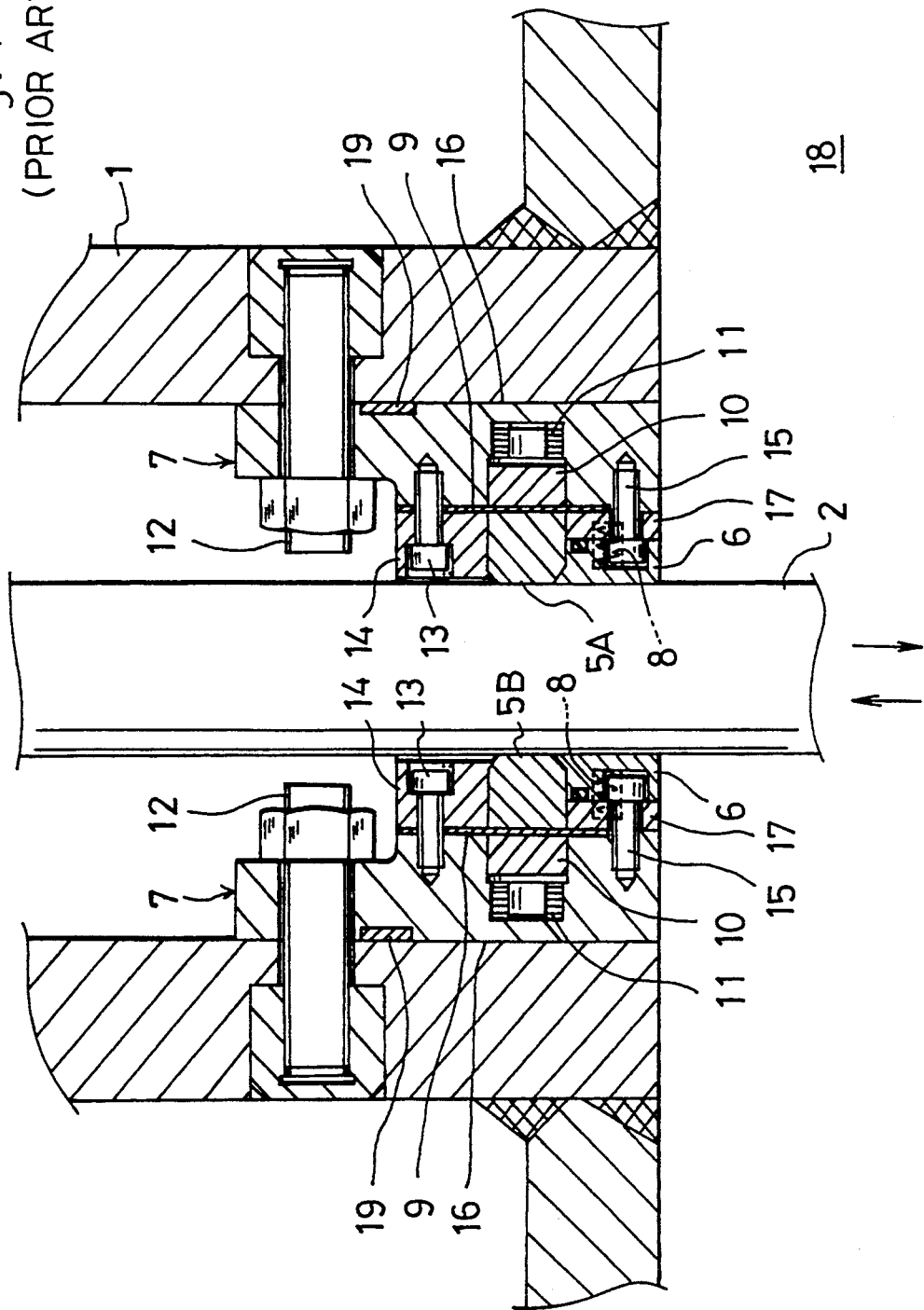
FIG. 4 is an enlarged half section view showing a prior art example.

In FIGS. 1 and 2, portions identical with or corresponding to those of the prior art example of FIG. 4 are designated by the same reference numerals, and their detailed description is omitted.

Referring to FIGS. 1 and 2, in a valve body 1, disposed is a sliding valve disc 2 which can slide from the full open position shown in the figures to the full close position in the leftward direction. In order to improve the sealing properties and the resistance to abrasion and prevent the seizing from occurring, the surface of the sliding valve disc 2 is provided with a coating (for example, LCIC coating produced by Union Carbide Corp.). The sliding valve disc 2 is connected to an operating rod 4 through a valve rod 3.

Ring-like valve body seats 5A, 5B are made of composite Grafoil ("Grafoil" is a trade name of flexible graphite produced by Union Carbide Corp.), etc. containing SC carbon or metal foil. Seat rings 6, 6 for preventing valve body seats from slipping out are made of, for example, nickel cast iron, or carbon steel which underwent a surface hardening treatment. Between the sliding valve disc 2 and ring-like seal boxes 7, 7, the ring-like valve body seats 5A, 5B, the seat rings 6, 6, ring-like retainers 14, 14, ring-like spacers 17, 17, etc. are disposed. The ring-like seal boxes 7, 7 are fastened to the valve body 1 by first fastening members 12, 12 each of which consists of a bolt passing through an outer wall of the valve body 1 and the ring-like seal box 7, and a nut screwed onto the bolt. Each of ring-like seal members 9, 9 consists of, for example, a Grafoil gasket containing a metal thin plate.

Ring-like grooves 20 are formed on the faces of the ring-like seal boxes 7, 7 which oppose the sliding valve disc 2, respectively. The ring-like retainers 14, 14, and the ring-like spacers 17, 17 are fitted into the ring-like grooves 20, in such a manner that the retainers and spacers are disabled from moving in a radial direction under a state where the ring-like valve body seats 5A, 5B are sandwiched in a radial direction. The grooves 20 constitute an example of the fitting portions which are formed on the ring-like seal boxes 7, 7.

Ring-like convex portions 21 are formed in the inner periphery portions of the faces 16 of the ring-like seal boxes 7, 7 which are the mating faces with respect to the valve body 1. The ring-like convex portions 21 are fitted into ring-like concave portions 22 which are formed on the valve body 1, in such a manner that the ring-like convex portions 21 are disabled from moving in a radial direction. The concave portions 22 constitute an example of the fitting portions which are formed on the valve body 1.

The thus configured gate valve is used as, for example, a horizontal or vertical gate valve disposed in a flow path through which a hydrocarbon gas produced by thermal decomposition, or an exhaust gas passes.

The above-mentioned ring-like seal boxes 7, 7, backup rings 10, 10, ring-like seal members 9, 9, ring-like valve body seats 5A, 5B, ring-like spacers 17, 17, ring-like retainers 14, 14, seat rings 6, 6, first springs 8, 8, second springs 11, 11, ring-like gaskets 19, 19, grooves 20, 20, and concave portions 22, 22 are symmetrically disposed at the both side spaces of the valve body 1 which are located on both sides of the sliding valve disc 2.

This configuration can attain the same effects as those of the prior art example of FIG. 4. In addition, the paired ring-like retainers 14, 14 and paired ring-like spacers 17, 17 which sandwich the ring-like valve body seats 5A, 5B in such a manner that the seats are disabled from moving in a radial direction are fitted into the ring-like grooves 20, 20 of the ring-like seal boxes 7, 7 in such a manner that the retainers and spacers are disabled from moving in a radial direction. Even when, during a movement of the sliding valve disc 2, the pair of ring-like valve body seats 5A, 5B are pulled in the direction of the movement of the sliding valve disc 2 by a large frictional force, therefore, the ring-like valve body seats 5A, 5B do not move at all, whereby the ring-like valve body seats 5A, 5B are prevented from rubbing together the ring-like seal members 9, 9. Even when the frequency of moving the sliding valve disc 2 in the directions of the arrows becomes high, therefore, the ring-like seal members 9,9 are not abraded, and hence the lowering of the sealing properties due to the abrasion can be avoided. As a result, the ingress of foreign substances from the passage 18 into the spaces of housing the second springs 11, the fluid leakage into the space of the valve body 1 through the spaces of housing the second springs 11, and the like can surely be prevented from occurring. Moreover, the prevention of the ingress of foreign substances into the spaces of housing the second springs 11 can avoid the lowering of the spring function of the second springs 11, and that of the pressing force of the ring-like valve body seats 5A, 5B exerted on the sliding valve disc 2, whereby the sealing properties of the gate valve are prevented from lowering.

Since the ring-like valve body seats 5A, 5B do not move at all, and the ring-like convex portions 21 formed on the ring-like seal boxes 7, 7 are fitted into the ring-like concave portions 22 which are formed on the valve body 1, in such a manner that the ring-like convex portions 21 are disabled from moving in a radial direction, also the ring-like seal boxes 7, 7 are inhibited from moving. As a result, the lowering of the sealing properties due to the abrasion of the ring-like gaskets 19, 19 interposed at the mating faces 16 between the ring-like seal boxes 7, 7 and the valve body 1 can be avoided so that the fluid leakage from the mating faces 16 can surely be prevented from occurring.

Figure 3:
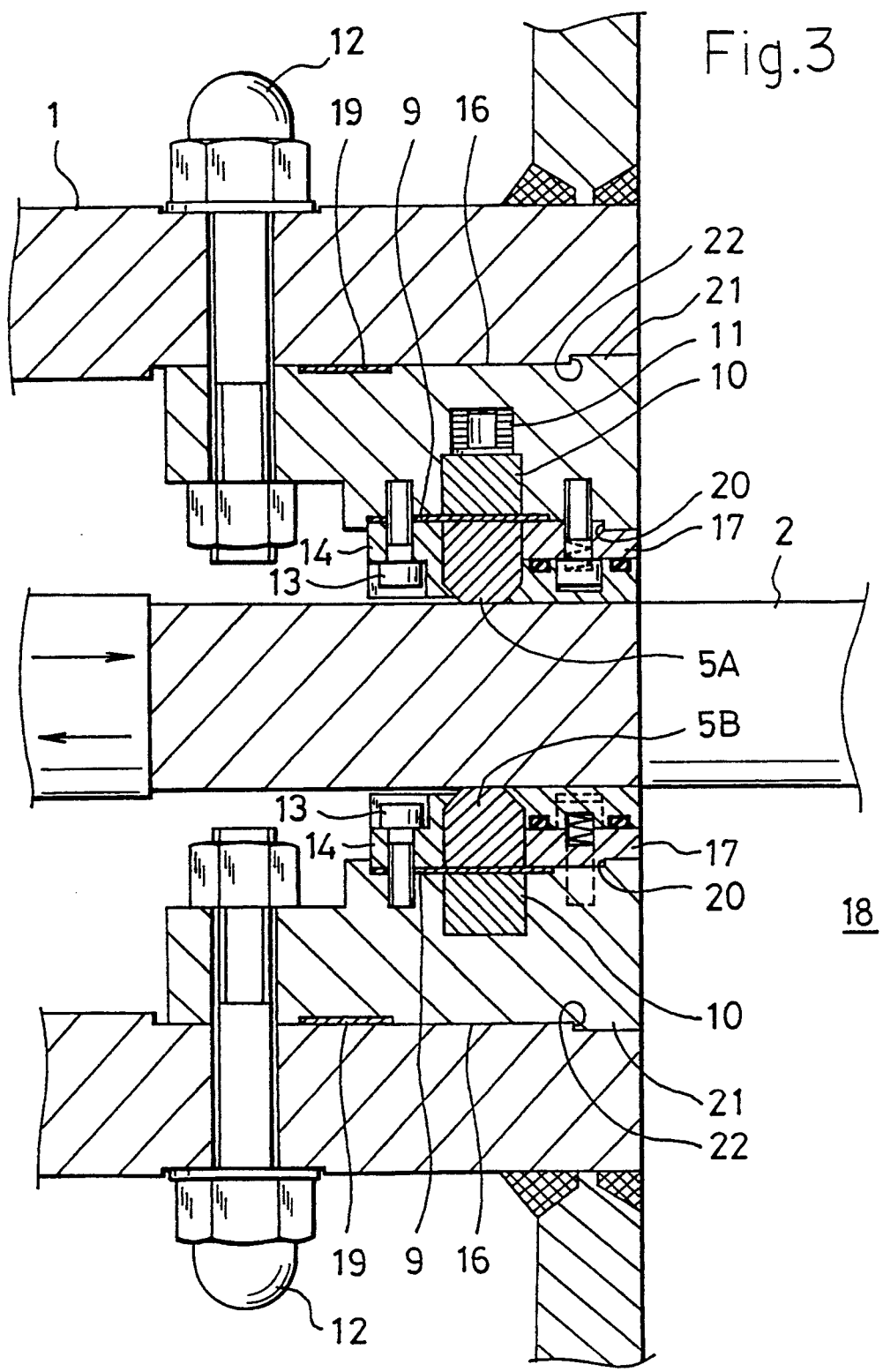
FIG. 3 is an enlarged half section view showing main portions of a gate valve according to another embodiment of the invention.

In the embodiment described above, the horizontal or vertical gate valve has the configuration in which the backup rings 10, 10 and the second springs 11, 11 are disposed in both the upstream and downstream sides of the sliding valve disc 2. The invention can be applied also to a horizontal or vertical gate valve having a configuration in which, as shown in FIG. 3, the backup rings 10, 10 and the second springs 11, 11 are disposed in one side (for example, the upstream side) of the sliding valve disc 2 and not disposed in the other side (for example, the downstream side). Also in such a horizontal or vertical gate valve, the ring-like seal boxes 7, 7, backup rings 10, 10, ring-like seal members 9, 9, ring-like valve body seats 5A, 5B, ring-like spacers 17, 17, ring-like retainers 14, 14, seat rings 6, 6, first springs 8, 8, ring-like gaskets 19, 19, grooves 20, 20, and concave portions 22, 22 can be disposed symmetrically in the both side spaces of the valve body 1 which are located on both sides of the sliding valve disc 2.

What is claimed is:

1. A gate valve comprising:
   a valve body;
   a ring-like seal box placed on an inner face of said valve body;
   a first fastening member for fastening said ring-like seal box to said inner face of said valve body;
   a backup ring fittingly held on a face of said ring-like seal box which opposes a sliding valve disc;
   a ring-like seal member extending over said opposing face of said ring-like seal box, and a face of said backup ring which opposes said sliding valve disc;
   a ring-like valve body seat which opposes said backup ring with said ring-like seal member between, and which contacts with said sliding valve disc;
   a ring-like spacer which is adjacent to an inner side of said ring-like valve body seat in a radial direction, and which opposes said ring-like seal box with said ring-like seal member between;
   a second fastening member for fastening said ring-like spacer to said ring-like seal box;
   a ring-like retainer which is adjacent to an outer side of said ring-like valve body seat in a radial direction, and which opposes said ring-like seal box with said ring-like seal member between;
   a third fastening member for fastening said ring-like retainer to said ring-like seal member;
   a seat ring for preventing said valve body seat from slipping out, said seat ring being placed to oppose said ring-like seal box with said ring-like spacer between, said seat ring contacting with said sliding valve disc;
   a first spring which is interposed between said ring-like spacer and said seat ring to urge said seat ring toward said sliding valve disc;
   a second spring which are interposed between said ring-like seal box and said backup ring to urge said ring-like valve body seat toward said sliding valve disc through said backup ring and said ring-like seal member;
   a ring-like gasket which is interposed at a mating face between said ring-like seal box and said valve body;
   a fitting portion which is formed on said ring-like seal box, and which holds said ring-like retainer and said ring-like spacer while disabling said ring-like retainer and said ring-like spacer from moving in a radial direction; and
   a fitting portion which is formed on said valve body, and which holds said ring-like seal box while disabling said ring-like seal box from moving in a radial direction.

2. A gate valve according to claim 1, wherein said ring-like seal member consists of a Grafoil gasket containing a metal thin plate.

3. A gate valve according to claim 1, wherein said first fastening member consists of a bolt passing through an outer wall of said valve body and said ring-like seal box, and a nut screwed onto said bolt, said second fastening member consists of a bolt passing through said ring-like spacer and screwed into said ring-like seal box, and said third fastening member consists of a bolt passing through said ring-like retainer and screwed into said ring-like seal box.

4. A gate valve according to claim 1, wherein said fitting portion formed on said ring-like seal box is a groove into which said ring-like valve body seat, and said ring-like spacer and said ring-like retainer which are respectively on inner and outer sides of said ring-like valve body seat are to be fitted.

5. A gate valve according to claim 1, wherein said fitting portion formed on said valve body is a concave portion into which a convex portion formed on said ring-like seal boxes is to be fitted.

6. A gate valve according to claim 1, wherein two sets of said ring-like seal box, backup ring, ring-like seal member, ring-like valve body seat, ring-like spacer, ring-like retainer, seat ring, first spring, second spring, ring-like gasket, fitting portion formed on said ring-like seal box, and fitting portion formed on said valve body are disposed symmetrically in the both side spaces of said valve body which are located on both sides of said sliding valve disc.

7. A gate valve according to claim 1, wherein two sets of said ring-like seal box, backup ring, ring-like seal member, ring-like valve body seat, ring-like spacer, ring-like retainer, seat ring, first spring, ring-like gasket, fitting portion formed on said ring-like seal boxes, and fitting portion formed on said valve body are disposed symmetrically in the both side spaces of said valve body which are located on both sides of said sliding valve disc, and
   said second spring is interposed only between the ring-like seal box and the backup ring which are disposed in one side space of said valve body.

* * * * *